United States Patent [19]

Vuletić

[11] Patent Number: 5,433,768
[45] Date of Patent: Jul. 18, 1995

[54] PROCESS FOR PRODUCING LIQUID PIG IRON FROM LUMP IRON ORE USING PLASTIC AND PETROLEUM COKE

[75] Inventor: Bogdan Vuletić, Düsseldorf, Germany

[73] Assignee: Deutsche Voest-Alpine, Dusseldorf, Germany

[21] Appl. No.: 243,753

[22] Filed: May 17, 1994

[30] Foreign Application Priority Data

May 28, 1993 [DE] Germany .................. 43 17 968.1

[51] Int. Cl.$^6$ ............................................. C21B 11/00
[52] U.S. Cl. ........................................................ 75/505
[58] Field of Search ........................... 75/445, 446, 505

[56] References Cited

U.S. PATENT DOCUMENTS 4,895,593 1/1990 Sulzbacher et al. .................. 75/446
5,259,865 11/1993 Greenwalt ............................. 75/445

Primary Examiner—Melvyn Andrews
Attorney, Agent, or Firm—Marshall & Melhorn

[57] ABSTRACT

A process for the direct production of sponge iron particles and liquid pig iron from lump iron ore is described, in which the iron ore is reduced as a loose bed in a direct reduction unit by means of hot reducing gases to sponge iron and is subsequently melted in a melting gasifier by means of the introduced carbon and blown in oxygen-containing gas, accompanied by the production of reducing gas. At least part of the reducing gas, after cooling to the temperature necessary for reduction, is introduced into the reduction zone of the direct reduction unit. A considerable part of the carbon and reducing gas is provided by a mixture of hydrocarbon-containing plastic and petroleum coke and/or coke (fines). The reducing gases are primarily at least partly obtained by cracking from the plastic and by thermal gasification from the coke.

16 Claims, No Drawings

PROCESS FOR PRODUCING LIQUID PIG IRON FROM LUMP IRON ORE USING PLASTIC AND PETROLEUM COKE

Large quantities of petroleum coke are produced during the industrial processing of crude oil and as a result of its high sulphur content said coke is difficult to use elsewhere and usually has to be disposed of at considerable cost.

Mixed forms of plastic products such as occur during waste processing also have to be disposed of at high cost. In accordance with the legal regulations they must be supplied to a material utilization. However, the existing processing capacities are not sufficient for the processing of such waste plastics, so that the large excessive material quantities have to be intermediately stored. Waste plastics can only be disposed of with ever rising costs.

DE 3,034,539 discloses a direct reduction process for the production of pig iron, in which the hot sponge iron discharged continuously from the direct reduction shaft furnace is charged from above into the melting gasifier, into which coal is introduced through openings and the oxygen-containing gas is blown in via radially positioned nozzles. Thus, a coal fluidized bed is formed, in which larger sponge iron particles are significantly decelerated and their temperature is raised significantly before they enter the high-temperature zone in the lower section of the coal fluidized bed and finally they can be melted. The known process gives no details on the quality of the coal to be used as the energy carrier. However, as a modification and further development thereof it can be assumed that if coal is used as the energy carrier, said process is suitable for using in limited quantities industrial waste products, such as plastics or to replace part of the coal by such waste products. However, this leads to difficulties. For example, an admixable petroleum coke fraction is limited by its high sulphur content and a plastic admixing by an excessive proportion of volatile components. At temperatures above 1000° C. in the melting gasifier the burnable components of organic plastics are decomposed pyrolytically by almost 100% to CO and $H_2$, i.e. almost exclusively reducing gas is formed and no coke or degassed carbon-containing products (char). As for the melting of sponge iron it is absolutely necessary to have a static bed of degassed coal (char), referred to as coke here, said bed must be formed from such carbon-containing additives, i.e. petroleum coke, coke or degassed coal. The high sulphur content of the petroleum coke requires the addition of large quantities of limestone and/or dolomite, so that as a result its addition quantity is extremely limited, because said fluxes once again lead to temperature problems in the reducing unit and to large slag quantities.

The problem of the present invention, based on the aforementioned prior art, is to provide a process overcoming the known problems when using plastics on the one hand and that of petroleum coke on the other, so that the existing waste disposal problems in connection with the indicated components can be solved in optimum manner in connection with pig iron production, accompanied by cheaper operating conditions.

In the case of the inventive mixed addition of petroleum coke and organic plastics these disadvantages are in part eliminated, so that a much larger proportion of the coal can be replaced by inexpensive waste material energy carriers, than would be the case on adding plastic and petroleum coke individually. Plastics contain no sulphur and only little ash, whereas the petroleum coke contains large amounts of sulphur, but only small amounts of volatile components. Independently of the sulphur content of the petroleum coke, according to the invention the ratio of the said two components is so matched that the characteristics of the plastic/petroleum coke mixture with respect to the volatile components is similar to a highly volatile coal.

Simultaneously the mixture is adjusted in such a way that the resulting reducing gases are primarily at least partly obtained by cracking from the plastic and by partial oxidation from the coke in such a way that the plastic acts as a CO and $H_2$ producer and the degassed coal as a CO producer.

As a result of its high solids content and low content of volatile components, the petroleum coke overproportionally contributes to maintaining the coke bed in the melting gasifier. The petroleum coke as the coke bed component and the plastic as the CO and $H_2$ supplier consequently supplement one another very well and reciprocally increase their possible, i.e. technically acceptable proportion in the coal mixture.

In the case of a somewhat lower sulphur content of the petroleum coke, 50 to 60% of the coal could be replaced by the said mixture, i.e. a specific waste material two-component system, so that the production costs for the pig iron in the present direct reduction process would be significantly reduced.

The use of coal with a low volatile component content, a low sulphur content and good particle distribution at elevated temperatures leads to a further increase in the plastic/petroleum coke fraction in the mixture. The limiting factor for the plastic proportion in the coal mixture is the reducing unit or the gaseous mixture produced in the melting gasifier.

In the presently described process, the reducing unit with its hot intermediate product, comprising sponge iron, burnt dolomite and lime simultaneously serves as a desulphurizing unit. As the reducing unit can only be overblown up to a given limit, it would be necessary in the case of a very high plastics proportion to provide an additional desulphurizing unit for the hot, dusty surplus gas. In the case of an overproportionally high petroleum coke fraction with a high sulphur content very high flux quantities are necessary, which lead to a high slag quantity and high heat requirement for calcining the fluxes or low temperatures in the reducing unit.

I claim:

1. A process for the direct production of pig iron from iron ore, said process including the steps of:
   a) reducing said iron ore in a direct reduction unit by means of reducing gases to form sponge iron;
   b) introducing a mixture of coal, petroleum coke and plastic waste into a melter gasifier;
   c) blowing oxygen containing gas into said melter gasifier and combusting said mixture to form at least a first fluidized bed of coke particles;
   d) introducing said sponge iron into said melter gasifier;
   e) reacting said mixture, said oxygen and said sponge iron to combust the major portion of said mixture and to form a reducing gas, the reducing gases primarily being at least partly obtained by a cracking of said plastic waste and by thermo gasification of said petroleum coke; and f) introducing at least a part of the reducing gas so formed into the reducing zone of said direct reduction unit after cooling said at least part of the reducing gas to the temperature necessary for the reduction.

2. The process defined in claim 1, wherein said mixture of coal, petroleum coke and plastic waste consists to of up to 60% mixture by weight of plastic and petroleum coke.

3. The process defined in claim 1, wherein the reducing gas includes CO and $H_2$ components and the plastic waste constitutes the CO and $H_2$ product, and the petroleum coke constitutes the CO producer.

4. The process defined in claim 3, characterized in that the proportion of plastic waste and petroleum coke is preselected as a function of the coal quantity and the sulphur content of the petroleum coke and the coal.

5. The process according to claim 4, characterized in that the ratio of plastic to petroleum coke is adapted to the sulphur content of the petroleum coke and the volatile component content of the coal.

6. The process defined in claim 5, characterized in that the plastic proportion in the mixture is chosen in such a way that at least a considerable quantity of the reducing gas obtained in the melting gasifier can be introduced into the direct reduction unit.

7. The process defined in claim 5, characterized in that the petroleum coke proportion in the mixture is chosen as a function of the sulphur content of the petroleum coke and the quantity of fluxes which bind the sulphur in the petroleum coke.

8. The process defined in claim 1, wherein the upper part of the melter gasifier is supplied an adequate quantity of oxygen, carbon dioxide and water vapor-containing gases to prevent soot formation during the decomposition of the plastic waste in the mixture.

9. A process for the direct production of pig iron from iron ore, said process including the steps of:
a) reducing said iron ore in a direct reduction unit by means of reducing gases to form sponge iron;
b) introducing a mixture of coal, coke and plastic waste into a melter gasifier;
c) blowing oxygen containing gas into said melter gasifier and combusting said mixture to form at least a first fluidized bed of coke particles;
d) introducing said sponge iron into said melter gasifier;
e) reacting said mixture, said oxygen and said sponge iron to combust the major portion of said mixture and to form a reducing gas, the reducing gases primarily being at least partly obtained by a cracking of said plastic waste and by thermo gasification of said coke; and
f) introducing at least a part of the reducing gas so formed into the reducing zone of said direct reduction unit after cooling said at least part of the reducing gas to the temperature necessary for the reduction.

10. The process defined in claim 9, wherein said mixture of coal, coke and plastic waste consists to of up to 60% mixture by weight of plastic and coke.

11. The process defined in claim 9, wherein the reducing gas includes CO and $H_2$ components and the plastic waste constitutes the CO and $H_2$ product, and the coke constitutes the CO producer.

12. The process defined in claim 11, characterized in that the proportion of plastic waste and coke is preselected as a function of the coal quantity and the sulphur content of the petroleum coke and the coal.

13. The process according to claim 12, characterized in that the ratio of plastic to coke is adapted to the sulphur content of the coke and the volatile component content of the coal.

14. The process defined in claim 13, characterized in that the plastic proportion in the mixture is chosen in such a way that at least a considerable quantity of the reducing gas obtained and the melting gasifier can be introduced into the direct reduction unit.

15. The process defined in claim 13, characterized in that the coke proportion in the mixture is chosen as a function of the sulphur content of the coke and the quantity of fluxes which bind the sulphur in the coke.

16. The process defined in claim 9, wherein the upper part of the melter gasifier is supplied an adequate quantity of oxygen, carbon dioxide and water vapor-containing gases to prevent soot formation during the decomposition of the plastic waste in the mixture.

* * * * *